(12) United States Patent
Lang et al.

(10) Patent No.: US 7,527,573 B2
(45) Date of Patent: May 5, 2009

(54) DRIVE TRAIN COMPROMISING AN INTERNAL COMBUSTION ENGINE AND TWO ELECTRIC DRIVE UNITS

(75) Inventors: Juergen Lang, Backnang (DE); Klaus Riedl, Tuebingen (DE)

(73) Assignee: Daimler AG, Stuttgart (DE)

( * ) Notice: Subject to any disclaimer, the term of this patent is extended or adjusted under 35 U.S.C. 154(b) by 377 days.

(21) Appl. No.: 10/555,307

(22) PCT Filed: Oct. 29, 2003

(86) PCT No.: PCT/EP03/11979

§ 371 (c)(1),
(2), (4) Date: Jul. 6, 2006

(87) PCT Pub. No.: WO2004/098935

PCT Pub. Date: Nov. 18, 2004

(65) Prior Publication Data

US 2006/0276287 A1 Dec. 7, 2006

(30) Foreign Application Priority Data

May 3, 2003 (DE) ................................. 103 19 880

(51) Int. Cl.
*F16H 3/72* (2006.01)
(52) U.S. Cl. ............................. 475/5; 475/149; 475/276
(58) Field of Classification Search ...................... 475/5, 475/317, 319, 311, 313, 276, 280, 149
See application file for complete search history.

(56) References Cited

U.S. PATENT DOCUMENTS

| 6,358,173 B1 | 3/2002 | Klemen et al. |
| 6,527,659 B1 | 3/2003 | Klemen et al. |
| 6,966,860 B2 | 11/2005 | Heitmann et al. |

FOREIGN PATENT DOCUMENTS

| DE | 42 25 315 C2 | 7/1995 |
| DE | 196 06 771 A1 | 8/1997 |
| DE | 199 16 489 C2 | 10/2000 |
| DE | 199 10 299 C1 | 4/2001 |
| DE | 41 24 479 C2 | 5/2002 |
| JP | 2001-47882 A | 2/2001 |
| WO | WO 94/19856 | 9/1994 |
| WO | WO 03/016749 A1 | 2/2003 |

OTHER PUBLICATIONS

Japanese Office Action dated Feb. 13, 2007 with English translation (Seven (7) pages).
International Search Report #PCT/EP03/11979.
German Search Report No. 10319880.6 dated Jan. 26, 2004.

*Primary Examiner*—Richard M. Lorence
*Assistant Examiner*—Edwin A. Young
(74) *Attorney, Agent, or Firm*—Crowell & Moring LLP

(57) ABSTRACT

In a drive train that includes an internal combustion engine and two electric drive units, drive torque of the internal combustion engine is superimposed on drive torque of an electric drive unit by means of a planet set to which the drive torque of the internal combustion engine is fed via a sun gear. The torque of the electric drive unit is transferred for different shift positions of a clutch by driving different ring gears of the planet set. The electric drive unit can be coupled directly to the input shaft via a clutch or can be coupled to a sun gear of the pick off gear unit via a clutch.

19 Claims, 5 Drawing Sheets

| Gang | K1 | K2 | K3 | B1 | B2 | BN | BR |
|------|----|----|----|----|----|----|----|
| 1    |    |    | ●  |    | ●  | ●  |    |
| 2    |    |    | ●  | ●  | ●  |    |    |
| 3    | ●  |    | ●  | ●  | ●  |    |    |
| 4    | ●  | ●  | ●  |    | ●  |    |    |
| 5    |    | ●  | ●  |    |    |    |    |
| 6    |    | ●  | ●  | ●  |    |    |    |
| 7    | ●  |    | ●  | ●  |    | ●  |    |
| R1   |    |    | ●  |    |    |    | ●  |
| R2   |    |    | ●  |    |    |    | ●  |
| R3   |    |    | ●  |    |    | ●  | ●  |

| Gang | K1 | K2 | B1 | B2 | BN | BR |
|---|---|---|---|---|---|---|
| 1 |  |  |  | ● | ● |  |
| 2 |  |  | ● | ● |  |  |
| 3 | ● |  |  | ● |  |  |
| 4 |  | ● |  | ● |  |  |
| 5 | ● | ● |  |  |  |  |
| 6 |  | ● | ● |  |  |  |
| 7 |  | ● |  |  | ● |  |
| R1 |  |  | ● |  |  | ● |
| R2 | ● |  |  |  |  | ● |
| R3 |  |  |  |  | ● | ● |

DRIVE TRAIN COMPROMISING AN INTERNAL COMBUSTION ENGINE AND TWO ELECTRIC DRIVE UNITS

BACKGROUND AND SUMMARY OF THE INVENTION

The invention relates to a drive train comprising an internal combustion engine and two electric drive units, and to a method for operating the same. Furthermore, the invention relates to a group of drive trains.

DE 196 06 771 C2 discloses a hybrid drive for motor vehicles, which has an internal combustion engine and two electric drive units. A first power branch is provided between an engine shaft of the internal combustion engine and an output element, such as an output shaft. The drive torque of the internal combustion engine passes via said power branch. The engine shaft can be coupled directly to the output shaft via a clutch. The first electric drive unit exchanges power with the first power branch in such a way that the drive torque of the first electric drive unit can be superimposed on the drive torque of the internal combustion engine. The second power branch is operated by the second electric drive unit. The power of the second drive unit is superimposed on the power of the first power branch and that of the second power branch, that is to say the power of the internal combustion engine and, if appropriate, the power of the first electric drive unit, via a pick off gear unit, such as a planet gear unit. According to the prior art, a sun gear of the pick off gear unit is connected to the engine shaft, while the torque of the second electric drive unit can optionally be transferred to two ring gears of the pick off gear unit with different diameters via two clutches of the second power branch. A speed-transforming transmission is connected between the clutches and the ring gears.

Further known hybrid drives are described in, for example, DE 41 24 479 C2, WO 94/19856 and DE 199 16 489 C2.

The present invention is based on the object of proposing a drive train and a method for operating the same which are improved in terms of combination with existing transmission concepts, different operating ranges,
different operating strategies,
power and/or torque balances and/or
formation of groups with different drive train concepts.

Furthermore, the object of the invention is to propose a group of drive trains which ensures a modular design for subgroups of different drive trains with a high number of identical parts.

The object on which the invention is based is achieved in that at least two operating positions are provided in the drive train. In a first operating position, the above-mentioned power branches can be coupled directly to one another, for example by a suitable clutch. Therefore, in this first operating position, the torque of the second electric drive unit is directly superimposed on the drive torque of the internal combustion engine without intermediate connection of further speed-transforming transmissions. In this operating position, a torque of the second drive unit can thus be added to the torque of the internal combustion engine, operation can take place exclusively by means of the second electric drive unit, energy can be recovered, for example by being fed into a battery or for operating the first electric drive unit, and/or the internal combustion engine can be operated by the second electric drive unit during a start operation.

According to the invention, in a second operating position the two power branches can be coupled to one another via the pick off gear unit. In this context, the two power branches each have a drive connection to two transmission elements (the transmission elements of the ring gear, planet, web, sun gear) of the pick off gear unit. The output of the pick off gear unit is formed in this case by a third transmission element. The superimposition by the pick off gear unit results in a variable transmission in the direction of the output element. In this way it is possible to implement, for example, what is referred to as a geared neutral point, represented by the output element when the internal combustion engine is working and the second electric drive unit is working. Furthermore, a forward or backward movement of the output element is possible depending on the rotational speed of the second electric drive unit.

The inventive configuration results in a configuration of the transmission ratios and operating possibilities which is improved compared to the prior art together with an optimum utilization of installation space.

According to a further proposal of the invention, the transmission element which conducts the drive torque of the internal combustion engine and, if appropriate, the drive torque of the second electric drive unit has a drive connection to a ring gear of the pick off gear unit. If the output is provided via a further transmission element of the pick off gear unit, the drive torque of the transmission element can easily be transmitted in the direction of the output element.

The pick off gear unit preferably has a double planet gear which has a drive connection to the abovementioned ring gear and to a second ring gear. The number of possible operating modes of the drive train can be increased by the second ring gear.

A particularly advantageous inventive configuration of the drive train is obtained if the output element is an input element of a component transmission which is connected downstream. This permits the inventive measures to be combined, for example in accordance with DE 199 10 299 C1, with a component transmission which is known. As a result, advantages of the measures according to the invention can be combined with advantages of transmissions which are known. The configuration according to the invention permits, in contrast with the above-mentioned prior art, the motor vehicle to be driven purely electrically while using all the gear speeds of the component transmission which is connected downstream. Furthermore, the component transmissions which are connected downstream can be used on the one hand for combination with an internal combustion engine and two electric drive units in drive trains, that is to say for a hybrid drive, and also likewise for other drive trains which only have, for example, one internal combustion engine. This permits the component transmission to be manufactured in large numbers for different purposes of use with a high proportion of identical components.

In a method according to the invention for operating a drive train, the drive train is operated in accordance with the operating conditions. The operating conditions are, for example, an operating temperature or operating period of the drive train, an operating temperature or operating frequency or a wear state of a starting element, a clutch or a brake, a charge state of a battery, a detected driving environment or a driver's request.

Depending on the operating conditions, the internal combustion engine is started (in some cases) with the second electric drive unit switched off and clutches opened, by applying the output torque of the first electric drive unit to the internal combustion engine. This permits, in particular, warm starting of the internal combustion engine by means of the first electric drive unit. For different operating conditions, the internal combustion engine is started with clutches closed, by applying the output torque of the first electric drive unit and of the second electric drive unit to the internal combustion engine. The torque which is available to crank the internal combustion engine is thus obtained by superimposing the drive torques of the two drive units. Owing to the increased available torque, this operating mode is suitable in particular for cold starting the internal combustion engine. For both of the abovementioned operating modes, the electric drive units are fed by a vehicle battery. Furthermore it is possible to crank the internal combustion engine with the first electric drive unit while the starting clutch is opened, while at the same time the motor vehicle is driven electrically by the second electric drive unit.

According to a development of the method according to the invention, depending on the operating conditions, the internal combustion engine is started with clutches closed, by applying the drive torque of the first electric drive unit and of the second electric drive unit to the internal combustion engine, with the pick off gear unit being intermediately connected in this case between the second electric drive unit and the internal combustion engine. This makes it possible for the output torque of the second electric drive unit to be transmitted in the direction of the internal combustion engine, permitting a further increased drag torque for the internal combustion engine. This operating mode is particularly suitable for extreme starting of the internal combustion engine.

According to developments of the method according to the invention, different partial operating ranges for the flow of force to the output element are possible during a driving mode:

In partial operating ranges with maximum power demand, drive is provided by the internal combustion engine, the first electric drive unit and the second electric drive unit.

In partial operating ranges in which there is neither an increased power demand nor is there a need for energy to be recuperated by the electric drive units, drive is provided exclusively by the internal combustion engine.

When drive is being provided by the internal combustion engine, the energy is fed back into a battery by the first and/or second electric drive unit in order to recover energy, for example in order to recharge the battery.

In partial operating ranges it is also possible for drive to be provided by the internal combustion engine and an electric drive unit, in particular the first electric drive unit. This electric drive unit is fed at least partially by the other electric drive unit which is used in the generator operating mode, in particular by the second electric drive unit. This saves the battery and/or permits longer operation when the battery is used.

According to a further proposal for achieving the object on which the invention is based, a group of drive trains is provided which each have a transmission connected downstream of the output element, for example in accordance with DE 199 10 299 C1.

This group has different subgroups of drive trains of different designs.

There is a first subgroup of drive trains which have a hybrid drive with an internal combustion engine and two electric drive units.

For a second subgroup of the drive trains, a hydrodynamic torque converter, instead of the parts which are necessary for the hybrid drive, is connected between the internal combustion engine and the output element in the installation area of the first and/or second electric drive unit (instead of said unit or units).

This embodiment of the invention results in a modular design for which the component transmission which is connected downstream of the output element can be combined with a suitable front mounted module so that when the component transmissions are the same a hybrid drive and a conventional drive, in particular an automatic transmission with a hydrodynamic torque converter, can easily be provided with a large number of identical components.

According to one inventive development of the group of drive trains, there is a third subgroup for which a starting clutch is intermediately connected between the internal combustion engine and the output element in the installation area of the first and/or second electric drive unit (instead of said drive unit or units). Accordingly, three different variants of drive trains can be provided with a simple modular design. For example, the third subgroup comprises drive trains for implementing an automatic transmission with an operating behavior which is more sporty compared to the second subgroup.

One particularly advantageous group of drive trains is obtained if the pick off gear unit is an input-end planet set of the component transmission. As a result it is possible to further reduce the number of necessary components needed for implementing a hybrid drive in accordance with the first subgroup.

BRIEF DESCRIPTION OF THE DRAWINGS

Preferred exemplary embodiments of the drive trains according to the invention and subgroups of the inventive group of drive trains are explained in more detail below with reference to the drawings.

DETAILED DESCRIPTION OF THE DRAWINGS

Figures 1, 2:
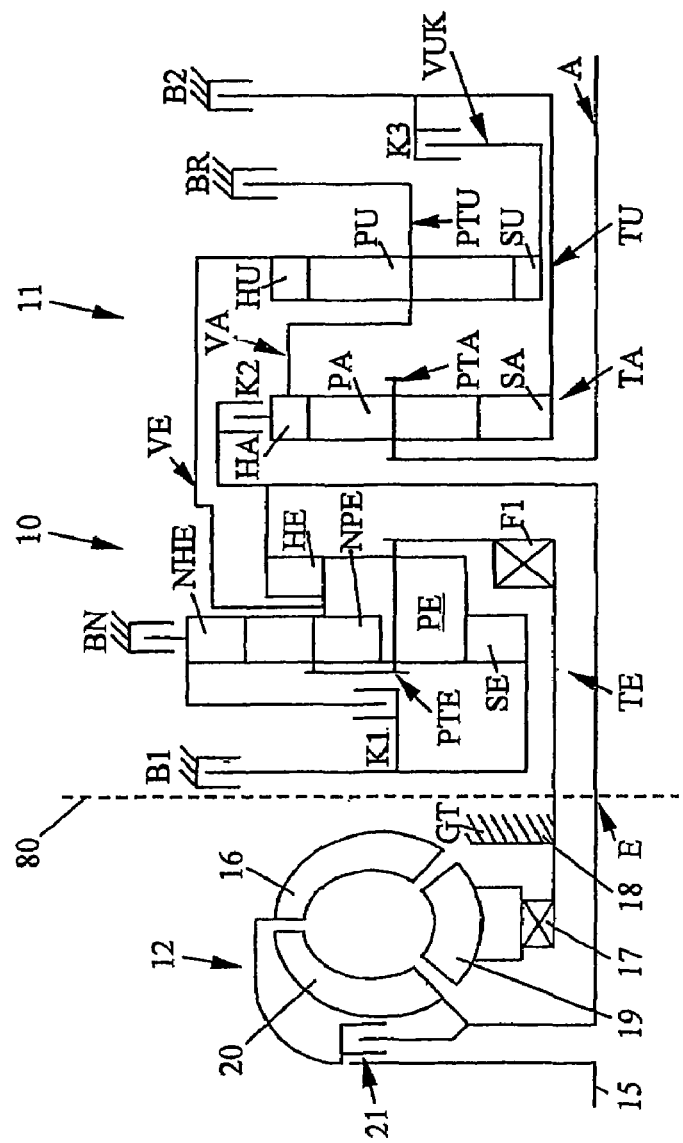
FIG. 1 shows a drive train according to a second subgroup from the group of drive trains with a component transmission, which is embodied as an automatic transmission, with a hydrodynamic torque converter.
FIG. 2 is a table of the shifting means (clutches/brakes) active in the individual gear speeds of the transmission in 1.

Drive trains 10 according to the invention have a component transmission 11 which is embodied as an automatic transmission and a transmission component which is connected upstream of the component transmission 11. According to FIGS. 1 and 3, the transmission component is embodied with a hydrodynamic torque converter 12, while according to FIGS. 5, 6 and 7 a hybrid set 13 is provided as the transmission component. The flow of force between the component transmission 11 and the transmission component 12, 13 takes place by way of an input shaft E.

Re the Function of the Component Transmission 11

An input-end planet gear component transmission TE has a planet carrier PTE on which planet gears PE are rotatably mounted. An external central gear HE, which has a rotationally fixed connection to the input shaft E, meshes with the planet gears PE. An internal central gear SE, which is connected to an engageable and disengageable frictionally locking brake B1 and to an engageable and disengageable clutch K1 also meshes with the planet gears PE. According to the embodiments of FIGS. 1 and 3, if appropriate in addition to FIGS. 5, 6 and 7, a freewheeling clutch F1 is arranged in operative terms between the planet carrier PTE and a nonrotating housing component GT and said freewheeling clutch F1 is engaged when the planet carrier PTE is rotating in the opposite direction to the direction of rotation of the input shaft E. An output-end planet gear component transmission TA has a planet carrier PTA on which planet gears PA are rotatably mounted and which is provided with a rotationally fixed drive connection to an output shaft A. An external central gear HA, which is connected to the input shaft E by an engageable and disengageable frictionally locking clutch K2 meshes with the planet gears PA. In addition, an internal central gear SA, which is connected to an engageable and disengageable brake B2, meshes with the planet gears PA.

A planet gear reversing component transmission TU has a planet carrier PTU on which planet gears PU are rotatably mounted and which is connected to an engageable and disengageable frictionally locking brake BR and is provided with a rotationally fixed drive connection VA to the external central gear HA of the output-end component transmission TA. An external central gear HU, which has a drive connection VE to the planet carrier PTE of the input-end component transmission TE meshes with the planet gears PU. In addition, an internal central gear SU meshes with the planet gears PU.

Figure 5:
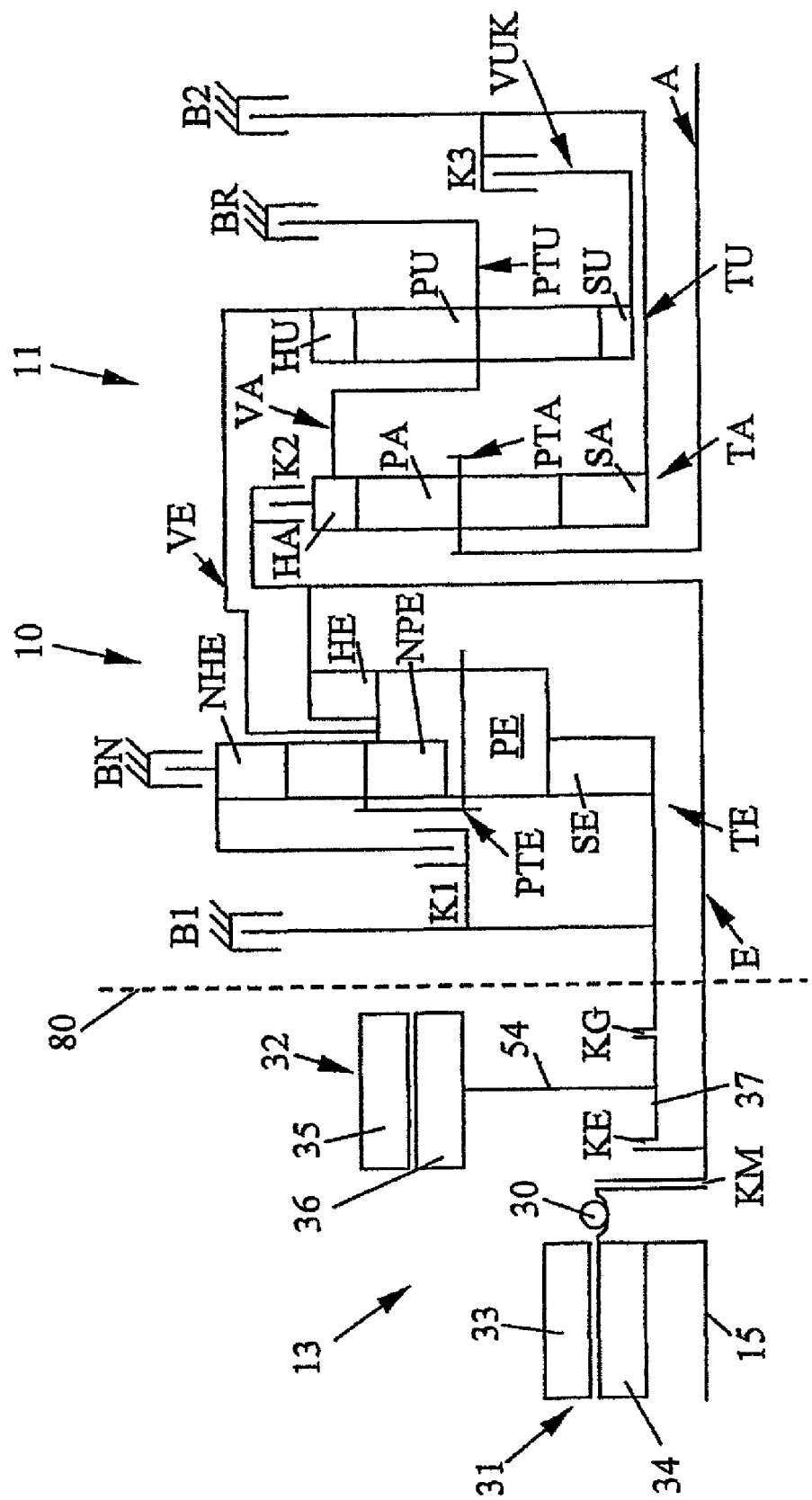
FIG. 5 shows a drive train from a first subgroup of a group of drive trains with a component transmission which is embodied as an automatic transmission, and hybrid set connected upstream.

According to the embodiments in FIG. 1 and FIG. 5, a drive connection VUK is provided between the two internal central gears SA and SU, said drive connection VUK being embodied in a releasable fashion by interconnecting an engageable and disengagable frictionally locking clutch K3.

Figures 3, 4:
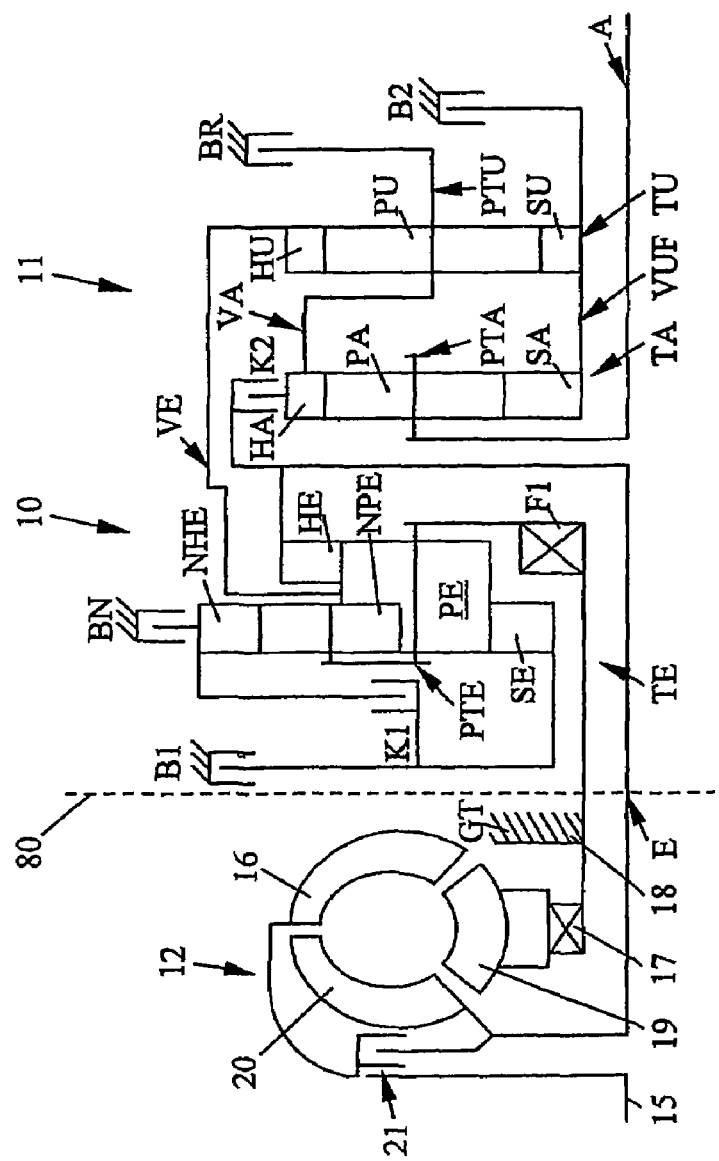
FIG. 3 shows a further embodiment of a drive train from a second subgroup of the group of drive trains with a component transmission which is embodied as an automatic transmission, and a hydrodynamic torque converter connected upstream of it.
FIG. 4 is a table of the shifting means (clutches/brakes) active in the individual gear speeds of the transmission according to 3.
Figure 6:
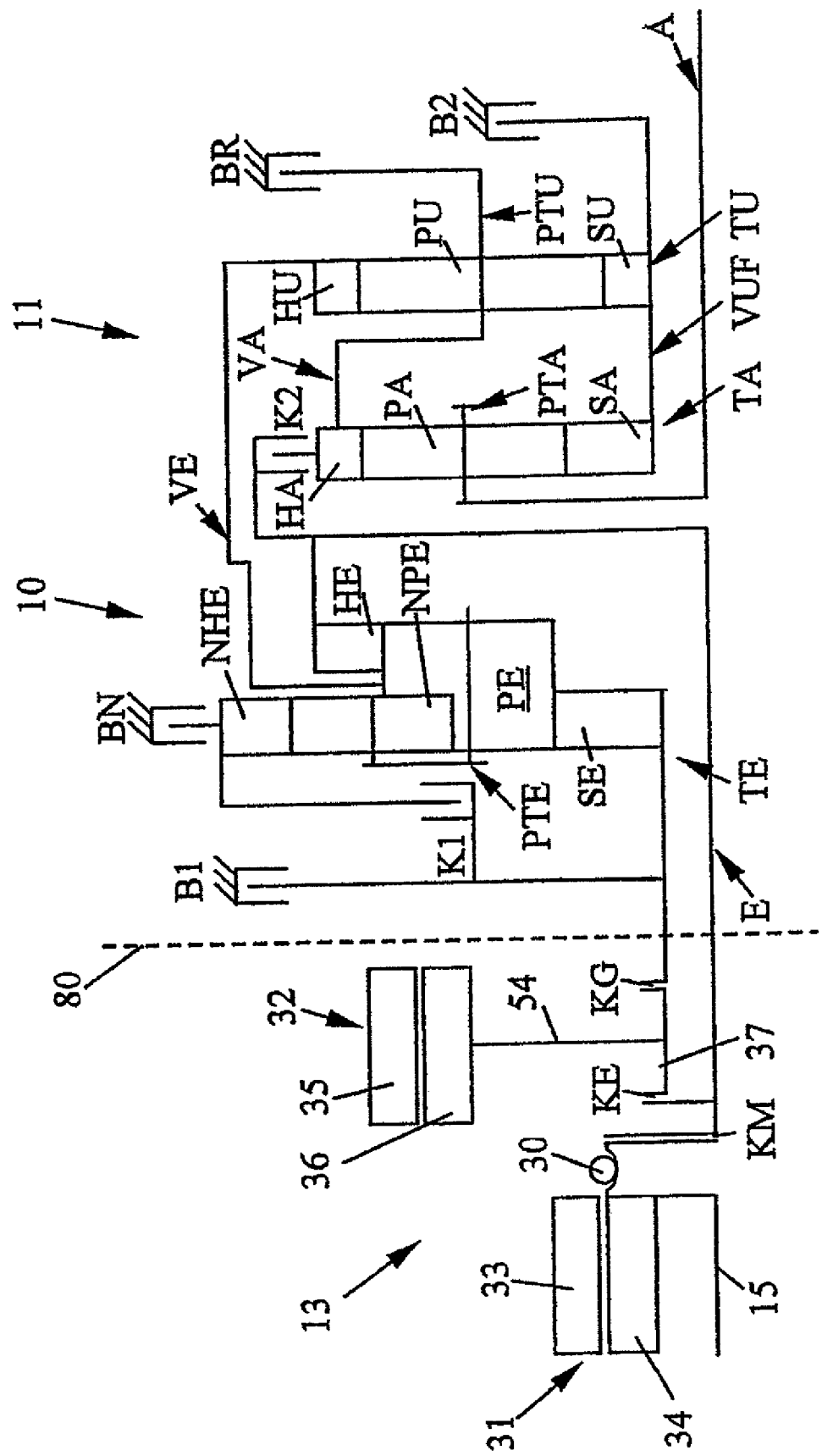
FIG. 6 shows a drive train according to a first subgroup of a group of drive trains with a component transmission which is embodied as an automatic transmission, and a hybrid set which is connected upstream.

According to the embodiments in FIG. 3 and FIG. 6, a drive connection VUF, which is continuously fixed in terms of rotation, is active between the two internal central gears SA and SU.

All the embodiments have in common the fact that secondary planet gears NPE are additionally rotatably mounted on the planet carrier PTE and mesh both with the planet gears PE and with an external secondary central gear NHE which is connected to an engageable and disengageable frictionally locking brake BN.

Transmission State 1st Gear Speed

For the embodiments according to FIG. 1 and FIG. 5, the transmission state is such that according to the table in 2 the brake B2 and the clutch K3 are engaged and as a result both component transmissions TA and TU are shifted to a static transmission ratio with a securely braked reaction element—central gears SA and SU—and are connected in series in the flow of force. Although this also applies to the input-end component transmission TE, the static transmission ratio which is connected when the secondary central gear NE is securely braked is higher in said component transmission TE than that when the central gear SE is securely braked.

Correspondingly, for the embodiments according to FIG. 3 and FIG. 6 the secondary central gear NHE is also securely braked by the brake BN, the central gears SA and SU are securely braked by the brake B2, and the three component transmissions TE, TA and TU are connected in series in the flow of force.

Transmission State 2nd Gear Speed

According to the table in FIG. 2, all three component transmissions TE, TA and TU which are shifted to their static transmission ratio with the reaction element—central gears SE, SA and SU—braked securely, and in series with respect to the flow of force so that the gear speed transmission ratio for the second gear speed results here from multiplicative connection of these three component transmission ratios.

According to the table in FIG. 4, for the embodiments according to FIG. 3 and FIG. 6 all three component transmissions TE, TA and TU are shifted to their static transmission ratio with the reaction element—central gears SE, SA and SU—braked securely, and in series with respect to the flow of force so that here, too, the gear speed transmission ratio for the 2nd gear speed results from multiplicative connection of these three component transmission ratios.

Transmission State 3rd Gear Speed

According to the embodiments in FIG. 1 and FIG. 5, the input-end component transmission TE is shifted to its component transmission ratio 1:1 and in series with the component transmissions TA and TU in the flow of force by the clutch K1, which component transmissions TA and TU are respectively shifted to their static transmission ratio, as a result of the engaged state of the brake B2 and the clutch K3, are respectively shifted to their static transmission ratio with the reaction element (central gear SA or SU) securely braked and connected in series with one another in the flow of force. Accordingly, in this case the gear speed transmission ratio results from the multiplicative connection of the static transmission ratios of the two component transmissions TA and TU.

According to the exemplary embodiments illustrated in FIGS. 3 and 6, owing to the respectively engaged state of the clutch K1 and of the brake B2 according to the table in FIG. 4 the input-end component transmission TE is shifted to its partial transmission ratio 1:1 and connected in series with the component transmissions TA and TU in the flow of force, corresponding to the transmission state for FIGS. 1 and 5, said component transmissions TA and TU being connected in series with one another in the flow of force in their respective static transmission ratio by the rotationally fixed coupling VUF of the central gears SA and SU when the reaction element is securely braked. Accordingly, the transmission ratio also results here from the multiplicative connection of the static transmission ratios of the component transmissions TA and TU.

Transmission State 4th Gear Speed

According to the table in FIG. 2, for the embodiments according to FIG. 1 and FIG. 5 the respectively engaged state of the clutches K1 and K2 and of the brake B2 cause the component transmissions TE and TU to be shifted to their respective transmission ratio 1:1 and the output-end component transmission TA to be shifted to its static transmission ratio when the reaction element is securely braked, so that the gear speed transmission ratio results solely from the static transmission ratio of the output-end component transmission TA.

According to the table in FIG. 4, for the embodiments according to FIG. 3 and FIG. 6 the respectively engaged state of the clutch K2 and of the brake B2 and the clutch VUF of the central gears SA and SU cause the component transmissions TE and TU to be disconnected from the transmission of force, and the output-end component transmission TA to be shifted to its static transmission ratio when the reaction element is securely braked, so that the gear speed transmission ratio results solely from the static transmission ratio of the output-end component transmission TA.

Transmission State 5th Gear Speed

According to the table in FIG. 2, for the embodiments according to FIG. 1 and FIG. 5 the three clutches K1, K2 and K3 are engaged so that all three component transmissions TE, TA and TU rotate as a common block, and consequently the 5th gear speed is configured as a direct gear speed.

According to the table in FIG. 4, for the embodiments according to FIGS. 3 and 6 the two clutches K1 and K3 are engaged. The function of the engaged clutch K3 according to FIG. 1 is assumed here again by the coupled connection VUF so that in this case also all three component transmissions TE, TA and TU rotate as a common block and a direct gear speed is retained.

Transmission State 6th Gear Speed

According to the table in FIG. 2, for the embodiments according to FIG. 1 and FIG. 5 the brake B1 and the clutches K2 and K3 are engaged, as a result of which all three component transmissions TE, TA and TU are connected to one another to form a linkage, with a securely braked central gear SE which steps up the drive of the coupled central gears SA and SU to a higher degree, and thus steps up the drive of the output shaft A to a lower degree compared to the input shaft E.

For the embodiments according to FIG. 3 and FIG. 6, the engaged state of the brake B1 and of the clutch K2 according to the table in FIG. 4, and the rotationally fixed coupled connection VUF of the central gears SA and SU in turn cause all three component transmissions TE, TA and TU to be connected to form a single linkage in which the securely braked reaction element SE steps up the drive of the central gears SA and SU to a higher degree, and respectively steps up the drive of the output shaft A to a lower degree, compared to the input shaft E.

Transmission State 7th Gear Speed

According to the table in FIG. 2, for the embodiments according to FIG. 1 and FIG. 5 the brake BN and the clutches K2 and K3 are engaged so that all three component transmissions TE, TA and TU are connected to form a single linkage in which the securely braked secondary central gear NHE steps up to an even greater degree the drive of the central gears SA and SU which are coupled fixed in terms of rotation, and to a lower degree steps up the drive of the output shaft A, in each case compared to the input shaft E.

According to the table in FIG. 4, for the embodiments in FIG. 3 and FIG. 6 the brake BN and the clutch K2 are engaged. The function of the engaged state of the clutch K3 in FIGS. 1 and 5 is assumed in this case by the rotationally fixed coupling VUF of the central gears SA and SU so that here too all three component transmissions TE, TA and TU are connected to one another to form a common linkage in which the securely braked secondary central gear NHE as a reaction element steps up the respective drive of the central gears SA and SU to an even greater extent and that of the input shaft A to a lesser extent, compared to the input shaft E.

Transmission State Reverse Gear Speed R1

According to the table in FIG. 2, for the embodiments according to FIG. 1 and FIG. 5 the brakes B1 and BR and the clutch K3 are engaged so that the two component transmissions TA and TU are connected to one another again to form a common linkage with a securely braked planet carrier PTU, upstream of which the input-end component transmission which has been changed to its static transmission ratio is connected in series in the flow of force. The static transmission ratio in turn results in a high gear speed transmission ratio while the effective reaction element PTU in the linkage imparts the opposite direction of rotation of the coupled central gears SA and SU whose rotational speed is somewhat reduced again in the output-end component transmission TA for the output shaft A.

According to the table in FIG. 4, for the embodiments according to FIGS. 3 and 6 only the brakes B1 and BR are disengaged, with the function of the engaged state of the clutch K3 in FIG. 1 being in turn fulfilled here by the coupling shaft VUF so that the two component transmissions TA and TU are connected to one another to form a common linkage with the securely braked planet carrier PTU as reaction element, upstream of which the input-end component transmission TE which has been changed to its static transmission ratio with the securely braked central gear SE is connected in series in the flow of force. The static transmission ratio imparts a high gear speed transmission ratio, while the engaged reverse gear speed brake BR is the cause of the opposite direction of rotation of the coupled central gears SA and SU whose rotational speed is somewhat reduced again in the output-end component transmission TA for the output shaft A.

Transmission State Reverse Year Speed R2

According to the table in FIG. 2, for the embodiments according to FIG. 1 and FIG. 5 the clutches K1 and K3 and the reverse gear speed brake BR are engaged. In this way, the input-end component transmission TE rotates as a closed block with the component transmission ratio 1:1, downstream of which the linkage which is formed from the two other component transmissions TA and TU with the securely braked planet carrier PTU as reaction element is arranged in series in the flow of force. The component transmission ratio 1:1 supplies a lower gear speed transmission ratio, while the engaged brake BR imparts the opposite direction of rotation of the coupled central gears SA and SU whose rotational speed is somewhat reduced again in the output-end component transmission TA for the output shaft A.

According to the table in FIG. 4, for the embodiments according to FIG. 3 and FIG. 6 the clutch K1 and the reverse gear speed brake BR are engaged. The function of the engaged state of the clutch K3 according to FIG. 1 is also fulfilled in this case by the coupled connection VUF. As a result, the input-end component transmission TE rotates as a closed block with the component transmission ratio 1:1, downstream of which the linkage which is formed from the two other component transmissions TA and TU with the securely braked planet carrier PTU as reaction element is arranged in series in the flow of force. The component transmission ratio 1:1 supplies a lower gear speed transmission ratio, while the engaged brake BR imparts the opposite direction of rotation of the coupled central gears SA and SU whose rotational speed is somewhat reduced again in the output-end component transmission TA for the output shaft A.

Transmission State Reverse Gear Speed R3

According to the table in FIG. 2, the brakes BN and BR and the clutch K3 are engaged. Accordingly, the two component transmissions TA and TU are connected to one another to form a linkage with the securely braked planet carrier PTU as reaction element, upstream of which the input-end component transmission TE which is shifted into a static transmission ratio with the securely braked reaction element NHE is arranged in series in the flow of force. The secondary central gear NHE as reaction element is the cause in this case of the highest transmission ratio of the three reverse gear speeds R1 to R3, while the engaged brake BR imparts the opposite direction of rotation of the coupled central gears SA and SU whose rotational speed is somewhat reduced again in the output-end component transmission TA for the output shaft A.

According to the table in FIG. 4, for the embodiments according to FIG. 3 and FIG. 6 only the brakes BN and BR are engaged, with the function of the engaged state of the clutch K3 in FIG. 1 being in turn fulfilled in this case by the coupling shaft VUF. Accordingly, the two component transmissions TA and TU are connected to one another to form a linkage with the securely braked planet carrier PTU as the reaction element upstream of which the input-end component transmission TE which is changed to a static transmission ratio with securely braked secondary central gear NHE as reaction element is arranged in series in the flow of force. The securely braked secondary central gear NHE is the cause of a very high gear speed transmission ratio—the highest of the three reverse gear speeds, while the securely braked planet carrier PTU generates the opposite direction of rotation of the coupled central gears SA and SU whose rotational speed is somewhat reduced again in the output-end component transmission TA for the output shaft A.

For Connecting the Transmission Components: Second Subgroup with Torque Converter 12

According to FIGS. 1 and 3, the hydrodynamic torque converter 12 is connected upstream of the component transmission 11. In the former, an engine shaft 15 has a drive connection to a pump wheel 16. From the pump wheel 16 the drive torque is transferred to a turbine wheel 20 via hydrodynamic coupling and with intermediate connection of a stator 19 which is supported by means of a free-wheel 17 with respect to a housing 18, said turbine wheel 20 having a drive connection to the input shaft E. The hydrodynamic torque converter 12 which is formed with the pump wheel 16, freewheel 17, stator 19 and turbine wheel 20 preferably has a torque converter lockup clutch 21 by means of which the engine shaft 15 can be connected directly to the input shaft E in partial operating ranges. In addition, a torsion damper unit and/or a vibration (damper) unit may be provided in the hydrodynamic torque converter 12.

For Connecting the Transmission Components: First Subgroup with Hybrid Set 13

According to FIGS. 5 and 6, the flow of force from the engine shaft 15 passes into the hybrid set 13 via a torsion damper 30 and a clutch module KM, arranged downstream of the latter in series connection, to the input shaft E. According to an alternative embodiment (not illustrated) the torsion damper 30 is connected downstream of the clutch module KM, in particular a wet starting clutch. The drive train 10 has a first electric drive unit 31 and a second electric drive unit 32. The first electric drive unit 31 has a stator 33 which is fixed to the housing and interacts with the rotor 34 in order to generate a drive torque and/or to recover electrical energy. The rotor 34 is connected fixed in terms of drive to the input side of the torsion damper 30 or of the engine shaft 15 so that by means of the first electric drive unit 31 it is possible to feed a torque into the drive train 10 in addition to the internal combustion engine or else a torque which is present in the drive train 10 can be used (at least partially) to recover electrical energy.

The second electric drive unit 32 has a stator 35 and a rotor 36. The stator 35 is connected fixed to the housing, while the rotor 36 has a drive connection to an intermediate shaft 37 which has two clutches KE, KG. The intermediate shaft 37 can be connected directly to the input shaft E by the clutch KE.

Figure 7:
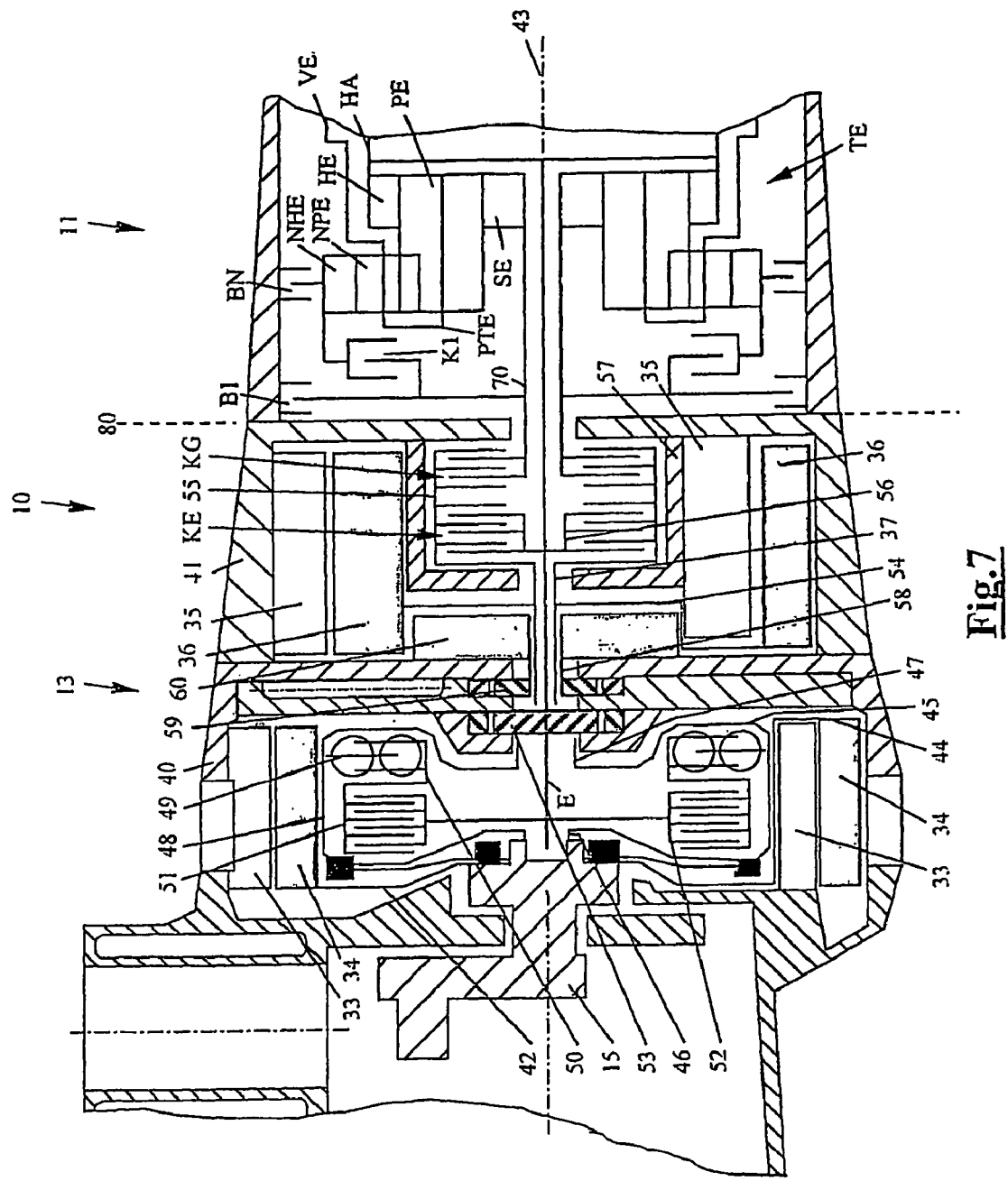
FIG. 7 shows a more detailed embodiment of part of the component transmission and of the hybrid set which is connected upstream, according to 5 or 6.

According to the exemplary embodiments illustrated in FIGS. 5, 6 and 7, the intermediate shaft 37 can be connected directly to the sun gear SE of the component transmission TE by means of the clutch KG.

The electric drive units 31, 32 are fed from at least one battery (not illustrated in the figures). The way in which the electric drive units 31, 32 are acted on and operated is determined by a suitable open-loop or closed-loop control device (also not illustrated). The open-loop control device acts on or interacts with a further open-loop control device for clutches and brakes of the drive train. Interaction with other closed-loop control devices, in particular for the internal combustion engine, is also possible. In the abovementioned open-loop control devices, operating parameters of the drive train, driver-specific parameters which are sensed in particular by a driver type detection and ambient parameters are taken into account.

FIG. 7 shows a structural embodiment of a drive train 10 with a hybrid set 13 and part of the component transmission 11. The hybrid set 13 is formed here with a housing which has a first housing part 40 and a second housing part 41. The engine shaft 15 projects into an interior space in the first housing part 40. By means of a disk 42 the engine shaft 15 is fitted in the end area with the rotor 34 which lies radially on the outside and is attached to said disk 42. The rotor 34 and disk 42 are constructed with an L shape in the illustrated half section. The stator 33, which is supported on a cylindrical inner wall of the first transmission part 40 (cf. FIG. 7 above the longitudinal axis 43-43) is arranged radially on the outside of the rotor 34 given approximately complete axial congruence. Accordingly, the first electric drive unit 31 is embodied as an internal rotor. In contrast, the first electric drive unit 31 may be embodied as an external rotor (cf. FIG. 7 below the longitudinal axis 43-43). According to this alternative configuration, the disk 42 has a U-shaped projection 44 which is oriented in the direction of the longitudinal axis 43-43 in the radially outer area, with one side limb of the U-shaped projection 44 being connected to the disk 42 in the end area, and the other side limb being fitted with the rotor 34 or being formed by the rotor 34. For this embodiment, the stator 33 is arranged on the inside between the side limbs of the projection 44 and supported in the axial direction on a wall of the first housing part 40 which is arranged adjacent to the internal combustion engine and oriented radially.

Furthermore, an internal housing 45 which is in the form of an outer casing in the cross section illustrated in FIG. 7 is connected to the engine shaft 15. The internal housing 45 has radially internal projections 46, 47 which are coaxial with respect to the longitudinal axis 43-43 and point away from one another, with the projection 46 being accommodated in the engine shaft 15 and the projection 47 which faces away from the internal combustion engine forming a bearing point of the internal housing 45 with respect to the first housing part 40. The torsion damper 30 and the clutch module KM are accommodated in the internal housing 45. The internal housing 45 has an outer casing face 48 to which the input side 49 of the torsion damper 30 which is embodied in one or more stages is connected radially on the inside. An output side 50 is connected fixed in terms of rotation to an internal lamina carrier 51 of the clutch module KM which interacts in a manner known per se with an external lamina carrier 52. What is referred to as a "flex plate" is preferably arranged between the internal housing 45 and the engine shaft 15. The internal lamina carrier 51, external lamina carrier 52 and torsion damper 30 are arranged axially one downstream of the other given identical radial dimensions, in such a way that the torsion damper 30 is arranged on the side of the clutch module KM facing away from the internal combustion engine.

The external lamina carrier 52 is connected to the input shaft E via a suitable shaft-hub connection. The input shaft is preferably supported radially on the inside of the engine shaft 15 or of the internal housing 45. The torsion damper 30, clutch module KM, part of the input shaft E, the shaft-hub connection and the internal housing 45 are arranged radially on the inside of the rotor 34 and stator 33. On the side of the internal housing 45 facing away from the internal combustion engine, the input shaft has a drive connection with a mechanical pump 53. The mechanical pump 53 is supported here with respect to the first housing part 40. The mechanical pump 53 is preferably arranged (at least partially) radially on the inside of the rotor 34 and stator 33 or of the internal housing 45 or the torsion damper 30 for reasons of installation space.

On the side facing away from the internal combustion engine, the first housing part 40 is connected to the second housing part 41, in particular screwed with a seal. The input shaft E extends from the interior space in the first housing part 40 into the second housing part 41 and on into the interior space in the component transmission 11. The input shaft E is surrounded by the intermediate shaft 37 which is formed as a hollow shaft. The intermediate shaft 37 is fitted with the rotor 36 of the second electric drive unit 32 by means of a radial disk-shaped carrying body 54 which is securely connected to said intermediate shaft 37. The second electric drive unit 32 is constructed here in such a way that it corresponds to the first electric drive unit 31 as an internal rotor or as an external rotor, cf the corresponding illustrations in FIG. 7 above and below the axis 43-43, respectively.

The intermediate shaft 37 has, on the side facing away from the carrying body 54, a cross-sectional extension which forms a cylindrical internal lamina carrier 55. The internal lamina carrier 55 is fitted both with internal laminas of the clutch KE and with internal laminas of the clutch KG. The clutches KE, KG are arranged axially closely adjacent to one another given comparable radial design. For the clutch KE, the internal laminas which are assigned to the internal lamina carrier 55 interact with corresponding external laminas which are mounted fixed in terms of rotation opposite an external lamina carrier 56. The external lamina carrier 56 is connected to the input shaft E so as to be fixed in terms of rotation, in particular by means of a suitable shaft-hub connection.

The second housing part 41 forms, with an internal shoulder, a hollow-cylindrical internal housing 57 which is fixed to the housing and which the input shaft E and the intermediate shaft 37 penetrate. The external casing face of the internal housing 57 serves preferably to mount the rotor 36 or to support the stator 35. The clutches KE, KG, the internal housing 57 and the lamina carriers 55, 56 are preferably arranged radially on the inside of the second electric drive unit 32.

Between the carrying body 54 and the mechanical pump 53 there is an oil pump motor 60 with a drive connection to a pump 59 by means of a further intermediate shaft 58 which is embodied as a hollow shaft. The oil pump motor 60 is arranged essentially radially on the inside of the second electric drive unit 32 and is supported on an end wall of the first housing part 40. The pump 59 is supported on the same end wall of the second housing part 41 or on an insert into it. The intermediate shaft 58 is mounted radially on the inside of the intermediate shaft 37 or radially on the outside of the housing part 40. A hydraulic pressure can be built up by means of the oil pump motor 60 independently of the operation or rotational speed of the internal combustion engine or of the input shaft E. For example, in this way a pressure can be applied for the first time to close the clutch KM. The two pumps 53, 59 are preferably configured in different ways so that, for example, the pump 53 is used for basic supply while the pump 59 is used to ensure requirements which are different from the basic supply.

The external laminas of the clutch KG interact with internal laminas which are connected fixed in terms of rotation to a hollow shaft 70. The hollow shaft 70 starts from the clutch KG and passes into the second housing part 41 in the direction of the component transmission 11. In the end area lying opposite the clutch KG, the hollow shaft 70 is connected fixed in terms of drive to the sun gear SE. Furthermore, according to the statements relating to FIG. 5 the hollow shaft 70 is operatively connected with the brake B1 and the clutch K1. Moreover, the further components of the component transmission 11 correspond to the configuration illustrated in FIG. 5 and described in the assigned description.

Operating States a) Stationary State of the Vehicle

For an "off" state, the selector lever is in the position "N" or "P". For a switched-off internal combustion engine and deactivated electric drive units 31, 32, KM, KE, KG, K1, B1, BN are in the nonactivated state.

For a warm start of the internal combustion engine, it is cranked by means of the first electric drive unit 31, which in this case outputs power. The rotational speed of the internal combustion engine is between zero and the idling speed. The selector lever is in the position "N" or "P". The clutches and brakes KM, KE, KG, K1, B1, BN are in the nonactivated state.

For a cold start of the internal combustion engine, it is cranked by means of a combination of the electric drive units 31, 32, with the electric drive units 31, 32 outputting power. The rotational speed of the internal combustion engine and thus of the second electric drive unit 32 is between zero and the idling speed. For this operating state, the clutches KM, KE are closed, while clutches and brakes KG, K1, B1 and BN are not activated. In this case, the pump 59 runs with a rotational speed greater than zero.

For an extreme start of the internal combustion engine, the two electric drive units 31, 32 act on the internal combustion engine, with the pick off gear unit TE being intermediately connected in this case in such a way that the output torque of the second electric drive unit 32 is made larger in the direction of the internal combustion engine. The second electric drive unit 32 is operated for this operating state with a higher rotational speed of the internal combustion engine, given by the transmission ratios, in particular with twice the rotational speed. Such an extreme start takes place in the selector lever position "P", the clutches and brakes KM, KG, K3 and B2 being closed while clutches and brakes KE, K1, B1, BN are deactivated. In this case also, the pump 59 is operated with a rotational speed greater than zero.

b) Conventional Operation Exclusively with Internal Combustion Engine

For a stationary vehicle and selector lever position "N", the clutches and brakes KM, KE, KG, K1, B1, BN are deactivated while the pump 59 is operated with a rotational speed greater than zero.

In this state, a temporary drive or warming-up support may be provided in the case where the first electric drive unit 31 is energized in such a way that it supplies a supportive torque.

For a stationary vehicle and selector lever position "D", in contrast to the comparable state in "N", the brake BN is activated. In this state also, a drive or warming-up support is possible by energizing the first electric drive unit 31.

If a start/stop function is provided, the pump 59 can be operated with a rotational speed greater than zero with a pressure of 2.5 bar given a stationary vehicle and selector lever position "D" with preselection of the first gear speed without acting on the electric drive units 31, 32 when the brake BN is activated and the brakes and clutches KM, KE, KG, K1, B1 are deactivated.

For starting and for the gear speeds 2 to 7 and for driving in the reverse gear speeds R1 to R3 it is possible to supply a supplementary torque by suitable energization of the electric drive unit 31 or else to recover energy in a generator operating mode of the electric drive unit 31. This takes place in particular during a normal driving mode or during a braking phase of the motor vehicle. In the abovementioned driving states, the selector lever is in the positions "D" or "R", while the second electric drive unit 32 is deactivated. The clutch KM is activated, while the clutches KE, KG are deactivated. The position of the clutches and brakes K1, B1, BN can be found in the statements relating to the shifting of the component transmission 11 in order to implement the individual gear speeds, see above.

When the clutches KE, KG are opened, the drag losses of the second electric drive unit 32 can be kept low since the latter is coupled only to the drive train when absolutely necessary.

c) Dual Operation of the Internal Combustion Engine with the Second Electric Drive Unit For a stationary vehicle with the selector lever position "N", the internal combustion engine runs at the idling speed while the clutches and brakes KM, KE, KG, K1, B1, BN are deactivated.

For starting and driving in the gear speeds 2 to 7 and reverse gear speeds R1 to R3, the rotational speed of the second electric drive unit 32 corresponds to the rotational speed of the input shaft E. An additional torque can be fed in by means of the first and second electric drive units 31, 32. Alternatively, an electric drive unit 31, 32 or both drive units can be operated in the generator operating mode in order to recover energy. For all the abovementioned gear speeds, the clutches KM, KE are activated while the clutch KG is deactivated. The state of the clutches and brakes K1, B1, BN results from the operating mode of the component transmission 11, see above.

d) Dual Operation of the Internal Combustion Engine with the Second Electric Drive Unit Including Ensuring a Geared Neutral Function In this state, a stationary state of the vehicle is ensured by virtue of a geared neutral function. In this state, the internal combustion engine is operated with a rotational speed which is greater than or equal to the idling speed. The electric drive unit 31 can then supply a positive or negative output torque. In this state, the rotational speed of the second electric drive unit 32 rotates at a rotational speed corresponding to the geared neutral point. The output torque of the second electric drive unit is in a fixed ratio—predetermined by the geometric conditions of the planet set 10—with the torque which is applied to the planet set on the input shaft E by the internal combustion engine and the first electric drive unit 31 via the ring gear HE. While the clutches KM and KG are activated, the clutches and brakes KE, K1, B1, BN are deactivated. The rotational speed, necessary for the geared neutral point, of the second electric drive unit 32 is obtained from the ratio of the diameter of the sun gear SE to the diameter of the ring gear HE.

Given an unchanged position of the clutches and brakes, forward travel or reverse travel is obtained for a reduction or increase in the rotational speed of the second electric drive unit.

The rotational speed potential and torque potential which results from this at the output of the transmission can be inverted qualitatively by applying the brake BR, as a result of which higher torques occur at negative velocities. The reverse gear speed with its transmission ratio is then included as a constant in the generation of the rotational speed and torque.

e) Electric Driving

For a deactivated internal combustion engine and deactivated first electric drive unit 31, the drive train can be operated exclusively by means of the second electric drive unit 32.

For a stationary vehicle with selector lever position "N", the clutches KM, KG, K1, B1, BN are deactivated, while the clutch KE is activated or deactivated.

Starting and driving in the gear speeds 2 to 7 and reverse gear speeds R1 to R3 is carried out by suitable energization of the second electric drive unit, with the latter either supplying a drive torque or feeding power to a battery in the generator operating mode. For these driving states, the selector lever is in the positions "D" or "R", while the clutches KM, KG are deactivated and the clutch KE is activated. The position of the clutch K1 and of the brakes B1, BN results from the shift states of the component transmission 11 in the respective gear speeds, see above.

Identical or comparable driving states of the motor vehicle can be achieved in various ways by means of the abovementioned, different operating states of the drive train 10. A suitable operating state for a desired driving state is selected, for example, by means of a characteristic diagram which includes, for example, efficiency levels, power balances, achievable acceleration values or the like. A suitable operating state can be selected, for example, according to an operating strategy which is predefined a priori. Alternatively or additionally it is possible to monitor individual operating variables of the drive train such as operating temperatures of drive units 31, 32 or clutches and brakes so that when a limiting value of an operating temperature is exceeded a clutch can be deactivated by changing an operating state of the drive train so that said clutch or an assigned drive unit is relieved of loading. Alternatively or additionally the charge state of a battery which serves to energize the drive units 31, 32 can be taken into account in the selection of the operating state.

The illustrated drive train 10 permits a hybrid operating mode with seven forward gear speeds which are present in addition to the hybrid drive, and with three possible reverse gear speeds, ensuring high transmissible output torques. The clutch KM may be a dry or wet clutch with partial or full starting functionality. Alternatively, the clutch KM can be given smaller dimensions by means of the configuration according to the invention since the clutch KM is subject (at least at certain times) to less stress for the different possible starting operating states and the electrical support of the drive train downstream of the clutch KM. If the clutch KM is overloaded, it can be relieved of loading by means of an electric drive unit by starting without this clutch KM.

When the second electric drive unit 32 and the internal combustion engine are operating simultaneously, in the first driving range an infinitely variable transmission ratio to the output element VE is ensured for the gear speeds 1 to 3, the stationary state of the vehicle and the reverse travel or an output to the output element VE and to the central gear HA for the gear speeds 4 to 7. In other operating states, the second electric drive unit 32 can be decoupled selectively so that an unnecessary drag power can be minimized or avoided.

The second electric drive unit 32 is preferably a high-torque slow rotor, while the first electric drive unit supplies a comparatively low torque at high rotational speeds.

The drive train 10 has two different power branches, in particular for operating the second electric drive unit 32, said power branches being different for different shift states of the clutches KE, KG.

For a closed clutch KE, the first power branch with the torque of the internal combustion engine passes via the engine shaft 15 and the torsion damper 30 as well as the clutch KM, if appropriate with exchange of power with the first electric drive unit 31. The second power branch runs via the second electric drive unit 32, the carrying body 54 and the intermediate shaft 37. In the first operating position, the two power branches are joined via the clutch KE so that the application of torque to the input shaft E, which is connected downstream in the flow of force, results from the superimposition of the drive torques of the first and second power branches. Owing to the closed clutch KE, the rotational speeds of the input shaft E, intermediate shaft 37, carrying body 54, clutch KM, if appropriate first electric drive unit 31, engine shaft 15 and of the internal combustion engine.

In a second operating position, the first power branch runs from the internal combustion engine via the engine shaft, the torsion damper 30, the clutch KM, the input shaft E, if appropriate with an exchange of power with the first electric drive unit 31, while the second power branch runs from the second electric drive unit 32 via the carrying body 54, the intermediate shaft 37 and the clutch KG. The two power branches are superimposed in the component transmission TE, specifically the pick off gear unit which is constructed with a planet set with a double planet gear and in which the ring gear HE is coupled fixed in terms of drive to the first power branch, and the sun gear SE is coupled fixed in terms of drive to the second power branch. Owing to the joining by the pick off gear unit, the first power branch and the second power branch can be operated at different rotational speeds.

The configuration according to the invention can particularly advantageously be used to obtain a modular method of construction for drive trains of different designs:

Accordingly, a first subgroup of drive trains contains features corresponding to the embodiment in FIG. 5, while a second subgroup of drive trains contains features according to the drive train in FIG. 1. Alternatively or additionally, a subgroup can be configured in accordance with features from FIG. 6 and/or a subgroup can be configured in accordance with features from FIG. 4. For such a configuration, an identical configuration for the component transmission 11 is obtained on the output side of the imaginary plane of intersection 80-80. Only the interface of the pick off gear unit or component transmission TE with the plane of intersection 80-80 has to be configured differently for the subgroups. While according to FIG. 1 the sun gear SE is connected only to the brake B1 and to the clutch K1, and thus does not have an interface with the plane of intersection 80-80, the hollow shaft 70 for the configuration according to FIG. 5 from the plane of intersection 80-80 is to be added to the connection of the clutch KG. On the other hand, according to FIG. 1 the web PTE is to be connected fixed to the housing via a free-wheel F1, while according to FIG. 5 a connection of the web PTE fixed to the housing is not necessary.

A planet set, present in any case, of the component transmission 11, specifically the component transmission TE, can be used to implement the hybrid set 13. It is particularly advantageous if the axial overall length of the hybrid set 13 corresponds approximately to the axial overall length of the torque converter 12 so that the drive trains of different subgroups can be used in identical installation spaces. Alternatively, the second housing part 41 has approximately the axial overall length of the torque converter 12.

There is preferably a third subgroup of drive trains in which, instead of the hybrid set 13, a (dry or wet) starting clutch is used. The abovementioned starting clutch or the torque converter 12 is arranged in particular in the areas, or radially on the inside of areas, in which the first and/or second electric drive unit 31, 32 is arranged for the first subgroup.

f) Infinitely Variable Driving Mode with Two Different Driving Mode Ranges

According to a further proposal of the invention, an infinitely variable transmission ratio with two driving ranges is made possible. The infinitely variable transmission ratio is brought about here in particular by superimposition of the drives by means of the second electric drive unit 32 and by means of the drive unit or the internal combustion engine which has a drive connection to the engine shaft 15, and/or by means of the first electric drive unit 31 via the planet gear component transmission TE, with the torque being transferred to the component transmission TA in a first driving range via the output element VE, and in a second driving range via the output element VE, the clutch K2 and the central gear HA.

For the exemplary embodiment according to FIGS. 5-7, in a first driving range the shifting elements KG, B2, K3 (as well as any driving element assigned to the engine shaft 15) are closed. In this driving range, when the external central gear HU is driven and the internal central gear SU is fixed to the housing, force is transmitted from the output element VE via the planet gear reversal component transmission TU to the planet carrier PTU which has a drive connection to the output shaft A via the drive connection VA and the planet gear component transmission TA, with the drive connection VA being connected to the external central gear HA, the internal central gear SA being fixed to the housing and the output shaft being connected fixed in terms of rotation to the planet carrier PTA.

The first driving range is preferably assigned to velocities of –x above zero to +x, with the reverse speed being capable of being limited by the open-loop control device. Speeds of (–75 km/h) –30 km/h to +75 km/h are preferably assigned to the first driving range. The maximum output torque is limited by one of the two above-mentioned units depending on the configuration of, and interplay between, the electric drive unit and the drive unit, and is, for example, 1300 Nm, in particular in the range between 10 km/h and 40 km/h. The limiting values of the transmission ratio are in particular –0.65 and +0.58 depending on the engine speed, with the limiting values being capable of being reduced in the partial load range.

For the exemplary embodiment according to FIGS. 5-7, in a second driving range the shifting elements KG, K2, K3 (and any starting element assigned to the engine shaft 15) are closed. In this driving range, when the external central gear HU is driven force is transmitted from the output element VE via the planet gear reversal component transmission TU. The internal central gear SU is connected fixed in terms of rotation to the internal central gear SA of the planet gear partial transmission TA via the clutch K3. The planet carrier PTU is connected via the drive connection VA to the external central gear HA which is also connected fixed in terms of rotation to the input shaft E via the clutch K2. The planet carrier PTA is connected fixed in terms of rotation to the output shaft A.

The second driving range is preferably assigned to relatively high velocities (for example of approximately 40 km/h to +300 km/h). The maximum output torque is lower than in the first driving range, for example 440 Nm in the range between 50 km/h and 250 km/h. The limiting values of the transmission ratio are dependent on the engine speed, for example −1.7 and +0.34, with smaller transmission ratios than in the infinitely variable operating mode being possible as a function of the rotational speeds of the drive units.

In the second driving mode range, there is in particular reduced torque loading of the electric drive units 31, 32. The overall transmission ratio of the transmission extends to overdrive ranges of 0.4 and below.

Switching over between the two driving ranges occurs if the rotational speed of the input shaft E and the second electric drive unit 32 have the same rotational speeds in the two driving ranges. This corresponds here in particular to the transmission ratio of the gear speed which is illustrated with open shifting elements B1, BN and K1. For such a change from one driving range into the other driving range there is no need for acceleration or deceleration of the inert masses, while at least the torque of the second electric drive unit 32 is changed absolutely and its direction changes.

For the driving mode, individual operating modes of the drive train are made possible, and these operating modes can be used entirely or only parts of the individual operating modes can be used. The drive train is preferably used

- as an infinitely variable automatic transmission, with in each case one gear speed constituting one operating mode,
- as an infinitely variable transmission in a first driving range,
- as an infinitely variable transmission in a second driving range.

Further possible operating modes are made possible according to the invention as follows:

In partial operating ranges with maximum power demand, drive is provided by means of the internal combustion engine, the first electric drive unit and the second electric drive unit.

In partial operating ranges in which there is neither an increased power demand nor is there a need for energy to be recovered by means of the electric drive units, drive is provided exclusively by means of the internal combustion engine.

When drive is being provided by means of the internal combustion engine, the energy is fed back into a battery by means of the first and/or second electric drive unit in order to recover energy, for example in order to recharge the battery.

In partial operating ranges it is also possible for drive to be provided by means of the internal combustion engine and an electric drive unit, in particular the first electric drive unit, this electric drive unit being fed at least partially by the other electric drive unit used in the generator operating mode, in particular by the second electric drive unit. This saves the battery and/or permits longer operation when the battery is used.

Further possible operating modes are starting an internal combustion engine, in particular alternatively or cumulatively by means of the first electric drive unit (31) and/or the second electric drive unit (32). A further possible operating mode relates to the use of the second and/or first electric drive unit (31, 32) for recovering energy or feeding back energy into a battery. Other possible operating modes result from the previously illustrated operating states a) to e).

Individual operating modes are selected according to a driving strategy which is stored in particular in a suitable control unit. The driving strategy here includes in particular selection of an operating mode according to a charge state of a battery at least one environmental parameter such as a gradient, a geodetic height, a temperature or the like, a vehicle parameter such as, for example, a load state, an operating temperature or an operating period of the drive train or of a drive unit, an operating temperature or an operating frequency or a wear state of a starting element, a clutch or a brake, at least one movement variable such as the vehicle speed or the vehicle acceleration, at least one variable which is dependent on a driver, such as activation of a pedal (acceleration request, brake pedal), manual activation (manual selection of different transmission programs) and/or a driver type which is determined, a characteristic diagram which contains, for example, degrees of efficiency, power balances, achievable acceleration values or the like, an operating strategy which is predefined a priori, and/or emission values (internal combustion engine or catalytic converter cold/warm), in which case the abovementioned influencing parameters may be a current parameter, chronologically previous parameters and/or an averaged parameter.

The invention claimed is:

1. A drive train comprising:
   an internal combustion engine;
   first and second electric drive units;
   a first power branch that conducts a torque from the internal combustion engine, wherein the first electric drive unit exchanges power with the first power branch in partial operating ranges;
   a second power branch that is operative at least in partial operating ranges, wherein the second electric drive unit exchanges power with the second power branch in partial operating ranges; and
   a pick off gear unit having a plurality of transmission elements, by which the power of at least one of the first and second power branches is transferred to an output element;
   wherein in a first operating position the power branches are coupleable directly to one another so that the power branches share a common drive connection to a single one of the transmission elements of the pick off gear unit; and
   wherein in a second operating position the power branches are coupleable to one another via the pick off gear unit, the power branches having drive connections to two transmission elements of the pick off gear unit, respectively.

2. The drive train as claimed in claim 1, further comprising clutches by which, in the first operating position, the second electric drive unit is placed in a drive connection with a transmission element which conducts a torque of the internal combustion engine, and by which, in the second operating position, the second electric drive unit is placed in a drive connection with the pick off gear unit.

3. The drive train as claimed in claim 2, wherein the transmission element has a drive connection to a ring gear of the pick off gear unit.

4. The drive train as claimed in claim 3, wherein the drive torque of the second electric drive unit has a drive connection to a ring gear of the pick off gear unit.

5. A method for operating a drive train as claimed in claim 2, the method comprising:
   under a first operating condition, starting the internal combustion engine with the second electric drive unit switched off and the clutches opened by applying an output torque of the first electric drive unit to the internal combustion engine; and under a second operating condition of the drive train, starting the internal combustion engine with the clutches closed, by applying both the output torque of the first electric drive unit and an output torque of the second electric drive unit to the internal combustion engine.

6. The method as claimed in claim 5, wherein, under a third operating condition of the drive train, starting the internal combustion engine with the clutches closed, by applying the drive torques of the first electric drive unit and of the second electric drive unit to the internal combustion engine via the pick off gear unit.

7. The drive train as claimed in claim 1, wherein in the second operating position the second electric drive unit is connected to a sun gear of the pick off gear unit.

8. The drive train as claimed in claim 7, wherein the pick off gear unit has a double planet gear which has a drive connection to the transmission element which is a ring gear and to a second ring gear of the pick off gear unit.

9. The drive train as claimed in claim 1, wherein a sun gear of the pick off gear unit is connectable to a brake so as to be fixed to a housing.

10. The drive train as claimed in claim 1, wherein a second ring gear of the pick off gear unit is connectable to a brake so as to be fixed to a housing.

11. The drive train as claimed in claim 1, wherein a second ring gear is connectable via a clutch to a sun gear of the pick off gear.

12. The drive train as claimed in claim 1, wherein a web of the pick off gear unit is connected to the output element so as to be fixed in terms of drive.

13. The drive train as claimed in claim 12, wherein, in addition to the web, power is output via the transmission element that is a ring gear.

14. The drive train as claimed claim 1, wherein the output element is an input element of a component transmission which is connected downstream.

15. The drive train as claimed in one of claim 1, wherein the second electric drive unit is decoupleable from a force flow in partial operating ranges.

16. A method for operating a drive train as claimed in claim 1, comprising, providing power with at least one of the internal combustion engine, the first electric drive unit and the second electric drive unit in partial operating ranges.

17. The method as claimed in claim 16, comprising, in partial operating ranges, providing power with only the internal combustion engine.

18. The method as claimed in claim 17, comprising, in partial operating ranges, providing power with the internal combustion engine with a feeding-back of energy into a battery via the second electric drive unit.

19. The method as claimed in claim 16, comprising, in partial operating ranges, providing power with the internal combustion engine and one of the electric drive units, this electric drive unit being fed at least partially by the other electric drive unit which operates as a generator.

* * * * *